UNITED STATES PATENT OFFICE.

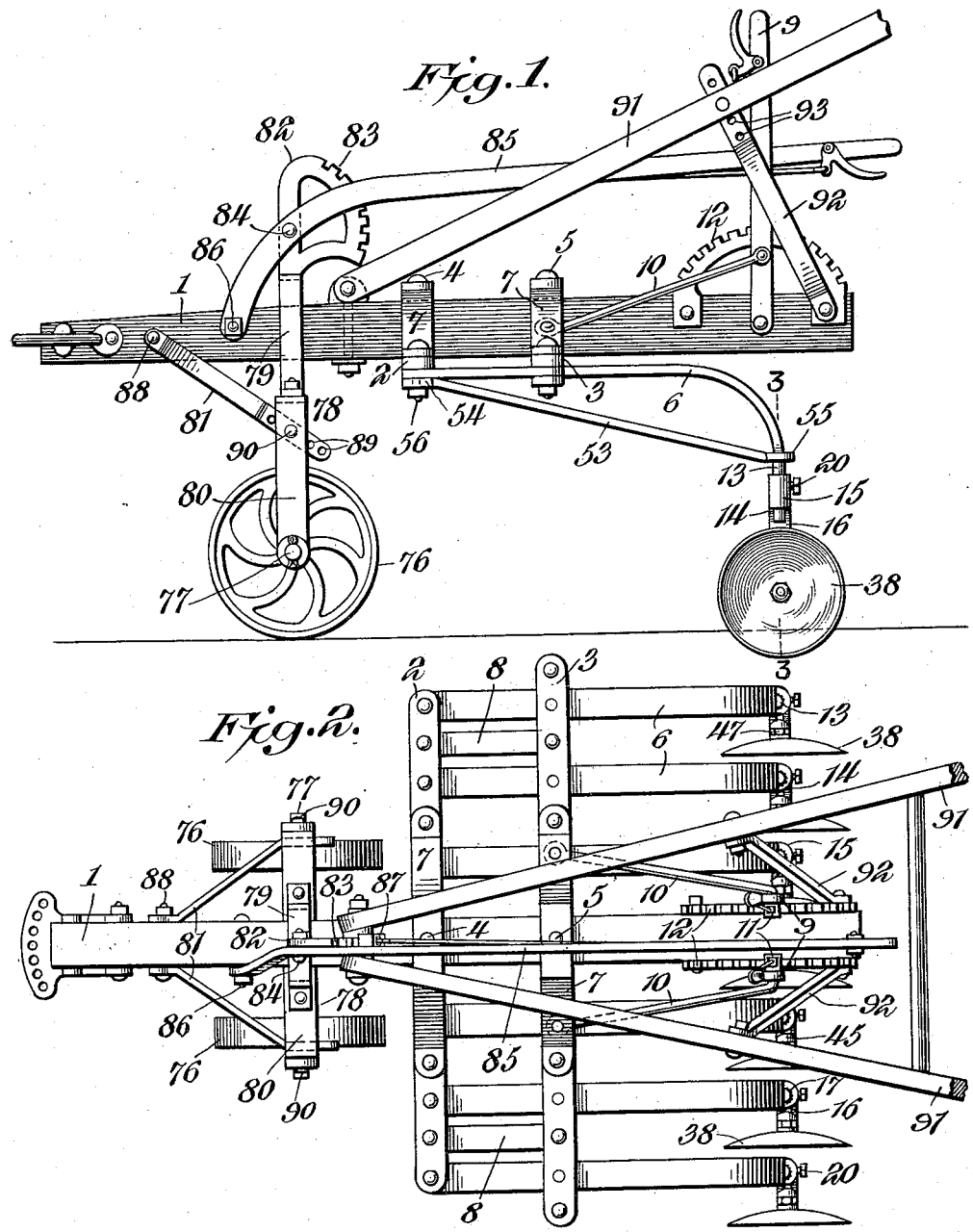

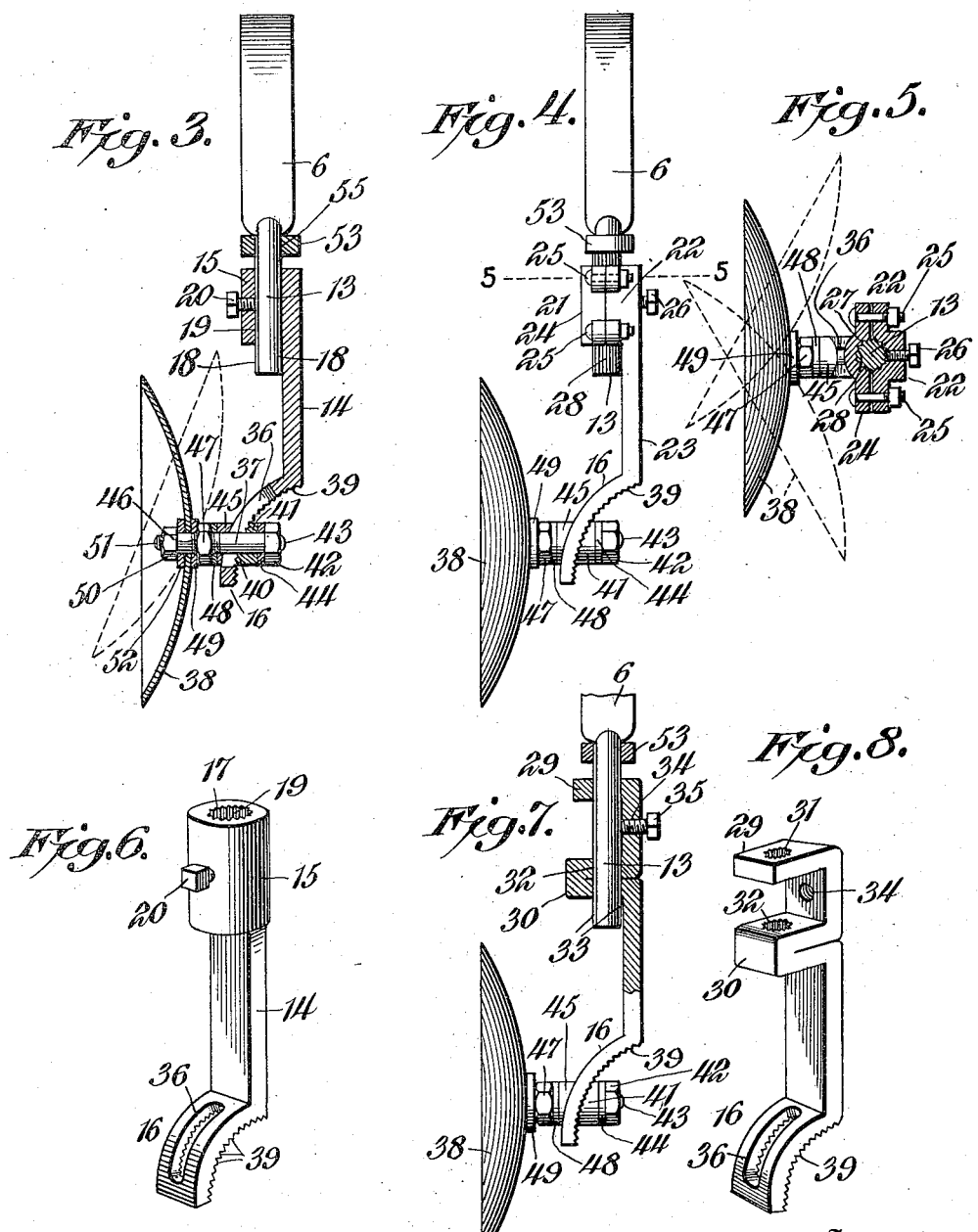

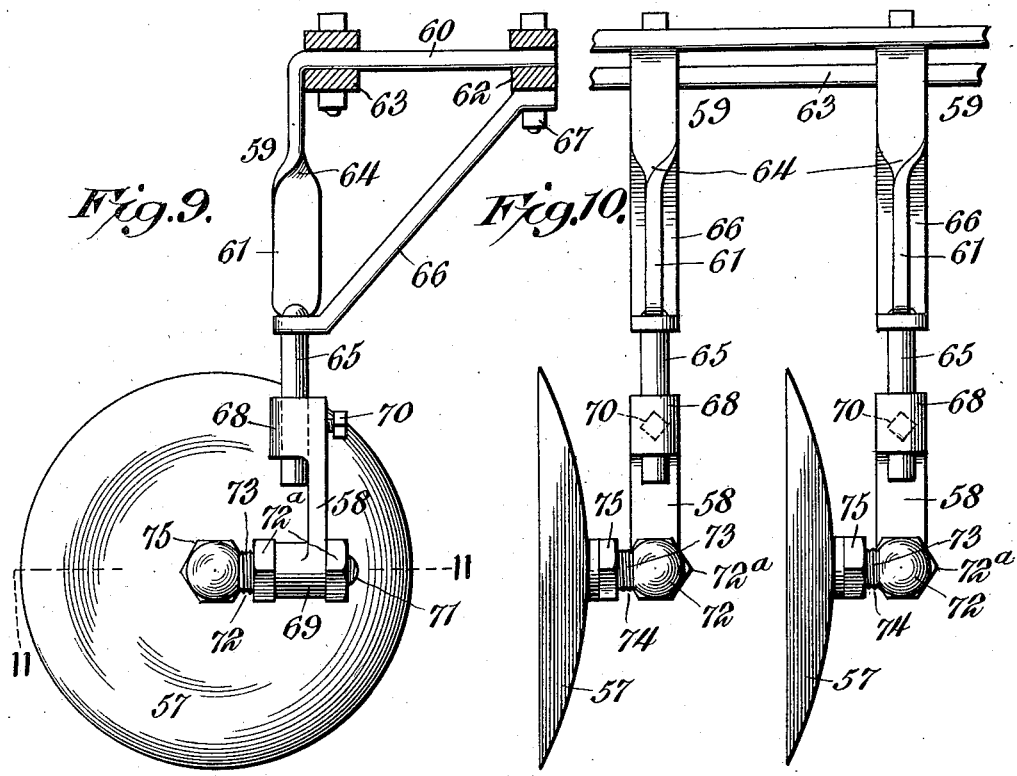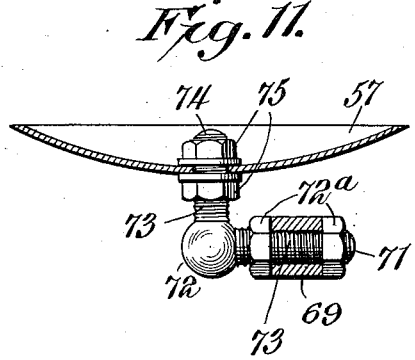

ARTHUR BRIGDEN, OF ALBERTVILLE, ALABAMA.

DISK CULTIVATOR.

1,031,518.	Specification of Letters Patent.	Patented July 2, 1912.

Application filed October 23, 1911. Serial No. 656,176.

*To all whom it may concern:*

Be it known that I, ARTHUR BRIGDEN, a citizen of the United States, residing at Albertville, in the county of Marshall and State of Alabama, have invented a new and useful Disk Cultivator, of which the following is a specification.

The invention relates to improvements in cultivators.

The object of the present invention is to improve the construction of cultivators, and to provide a simple, inexpensive and efficient cultivator, designed to be drawn by one horse for cultivating between the rows, and equipped with independently adjustable disks, adapted to be arranged in various adjustments to secure the desired lead and pitch and also to enable the cultivator to slope so as to fit the bed to be cultivated and also to enable the beam and the handle to be arranged in a plumb position while cultivating on the side of a hill.

A further object of the invention is to provide a cultivator of this character in which the disks may be permitted to have independent spring action similar to spring teeth, and provided with means for maintaining the disks in rigid relation with the beam when desired.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a cultivator, constructed in accordance with this invention. Fig. 2 is a plan view of the same. Fig. 3 is a vertical sectional view on the line 3—3 of Fig. 1. Fig. 4 is a detail rear elevation of a disk and its supporting means, illustrating another form of clamp. Fig. 5 is a detail horizontal sectional view on the line 5—5 of Fig. 4. Fig. 6 is a detail perspective view of the bracket shown in Fig. 3. Fig. 7 is a vertical sectional view, showing another form of bracket. Fig. 8 is a detail perspective view of the bracket illustrated in Fig. 7. Fig. 9 is a side elevation, partly in section, illustrating a rigid supporting means for connecting the disks with the pivoted laterally extending bars. Fig. 10 is a rear elevation of the same. Fig. 11 is a horizontal sectional view on the line 11—11 of Fig. 9. Fig. 12 is a detail perspective view of the L-shaped pivot bolt.

Like numerals of reference designate corresponding parts in all the figures of the drawings.

In the accompanying drawings in which is illustrated the preferred forms of the invention, 1 designates a cultivator beam, preferably constructed of wood and having pivoted to it at intermediate points front and rear laterally extending bars 2 and 3, arranged in pairs at opposite sides of the cultivator beam and adjustable backwardly and forwardly on their pivots 4 and 5 to arrange disk carrying spring bars 6 in various positions in a similar manner to correspondingly adjustable spring teeth. The laterally extending bars 2 and 3 are supported by transverse braces 7 and are connected by short longitudinal bars 8. The braces 7, which are arranged in pairs, have their inner ends overlapped and pivoted to the beam by the pivots 4 and 5, and they move in unison with the laterally extending bars 2 and 3 in the usual manner. The longitudinal spring bars are pivotally connected with the transversely disposed bars 2 and 3, and the latter are adjustable in their backward and forward pivotal movement by means of a pair of operating levers 9, pivoted at their lower ends to opposite sides of the beam 1 at the rear portion of the same and connected by links 10 with the rear laterally extending bars. The operating levers 9 are equipped with suitable pawls or detents 11 for engaging toothed segments 12, whereby the laterally extending bars are locked in their adjustment. The toothed segments, which are secured to the cultivator, extend upward at the opposite sides thereof, but as the particular construction for adjusting the laterally extending bars and the specific means for pivotally connecting the said bars with the cultivator beam and with the spring bars do not constitute a portion of the present invention, the said parts may be mounted in any preferred manner to secure the backward and forward pivotal movement of the bars 2 and 3 and the consequent adjustment of the spring bars.

The spring bars 6, which are arranged in parallelism, have downwardly curved rear portions and are provided at their rear ends with vertically disposed shanks or pivots 13 on which brackets 14 are adjustably mounted. The brackets 14 consist of a vertical bar or body provided at the upper end with an integral sleeve 15, and having its lower portion curved to form an arm 16. The sleeve 15 provides a bearing eye or opening 17 to receive the shank or pivot 13, and while the pivot and the eye may have smooth bearing surfaces, yet it is preferable to provide the shank or pivot 13 with opposite longitudinal ribs 18 to engage grooves or corrugations 19, formed in the walls of the bearing eye or opening of the bracket and extending longitudinally of the same. When the eye or sleeve 15 is formed integral with the body of the bracket, the latter preferably consists of a malleable casting, and it is necessary in order to secure horizontal rotary adjustment of the bracket to remove the latter from the shank or pivot 13 and replace the same thereon in the desired position, the bracket being secured in such position by means of a set screw 20, piercing the sleeve and engaging the shank or pivot.

Instead of forming a continuous sleeve or bearing 15, the bearing eye may be in the form of a sectional clamp 21, as illustrated in Figs. 4 and 5 of the drawings. The section 22 of the clamp 21 is formed integral with the shank or body of the bracket 23, and the other section 24 is secured to the section 22 by means of opposite bolts 25, which supplement the action of the set screw 26 in securing the bracket in its adjustment. The eye or opening of the sectional clamp is provided with grooves or corrugations 27, and the shank or pivot of the spring bar has corresponding corrugations 28 to interlock with the grooves or corrugations of the sectional clamp to prevent the bracket from slipping on the shank or pivot of the spring bar. The brackets 14 and 23 are also capable of vertical adjustment in addition to the rotary adjustment heretofore described.

Instead of constructing the brackets of malleable castings, the bracket may be made from a single piece of metal, as illustrated in Fig. 8 of the drawings, the upper end of the metal being bent horizontally to provide a lug or eye 29, and the metal being angularly bent and folded on itself at an intermediate point to provide a lower eye 30. The eyes or openings 31 and 32 of the lugs or ears 29 and 30 have the usual corrugations and are adapted to be engaged by opposite ribs 33 of the shank of the spring bar. The bracket is provided between the lugs or ears 29 and 30 with a threaded opening 34 for the reception of a set screw 35 for securing the bracket in its adjustment. Each of the brackets has the said curved portion or arm 16, which is provided with a longitudinal slot 36 for the reception of a bolt or pivot 37, upon which a disk 38 of any preferred construction is mounted. The arm 16, which is curved downwardly and outwardly, is provided at its concave face with corrugations 39, which are engaged by corresponding corrugations 40 of a clamping block 41, mounted on the bolt or pivot 37 and held in engagement with the arm by means of a nut 42. The nut 42 engages a threaded terminal portion 43 of the bolt, a washer 44 being preferably interposed between the nut and the block. The convex face of the curved arm is smooth and is engaged by a smooth curved face of a clamping block 45. The clamping blocks 41 and 45 have openings through which the bolt or pivot passes, and the said bolt or pivot is provided with an intermediate threaded portion 46, receiving a nut 47 located in the space between the curved arm and the disk 38, washers 48 and 49 being interposed between the intermediate nut 47 and the block 45 and the disk 38. The disk is retained on the outer smooth portion of the bolt or pivot by means of a nut 50, engaging the outer threaded portion 51 of the bolt or pivot, a washer 52 being interposed between the nut and the concave face of the disk, as clearly shown in Fig. 3 of the drawings. The disk is adapted to be raised and lowered through the vertical adjustment of the bracket to arrange it at the proper depth, and it is adapted to be swung or adjusted horizontally on the vertical pivot of the bracket to secure the proper lead, and it is adapted to be tilted by sliding the pivot or screw upwardly and downwardly along the slot of the curved arm to arrange the disk at the desired pitch or inclination, as illustrated in dotted lines in Figs. 3 and 5 of the drawings. The various disks of the cultivator are adjustable independently of one another, and they may be arranged in various positions for cutting and pulverizing the soil, for throwing the latter in the desired direction and also to arrange the disks to fit the slope of a bed or other condition of surface to be cultivated. The adjustment of the disks through the pivotal action of the laterally extending bars enables the disks to be arranged different distances apart, and in various positions with relation to one another, and the disk cultivator may be varied in width similar to the spring tooth cultivator and is susceptible of all of the adjustments of the same.

The independent spring action of the longitudinally disposed bars 6 is adapted to secure a chopping and more complete pulverizing of the soil than is possible with relatively rigid disks, and the spring construction is especially adapted for light sandy loam. However, when it is desired to render the disks relatively rigid, detachable longitudinal braces 53 are employed. The braces 53, which are inclined, extend downwardly and rearwardly from the front ends of the longitudinal spring bars to the upper ends of the shanks or pivots, and they are provided at their front and rear ends with eyes or openings 54 and 55 to receive the front pivot bolts 56 and the rear shank or pivots 13. The braces may be readily applied to and removed from the spring bars to provide a cultivator of the desired character by permitting the spring action or eliminating the same.

In Figs. 9 to 12 inclusive is illustrated another form of invention in which the disks 57 are connected by brackets 58 with relatively rigid bars 59 of approximately L-shape consisting of upper horizontal portions 60 and rear vertical portions 61. The horizontal portion 60 is pivotally connected with front and rear laterally extending bars 62 and 63 similar to those heretofore described, and the rear vertical portion, which depends from the rear bar 63, is provided at an intermediate point with a quarter bend 64 to stiffen it, and it has a lower pivot portion 65. The depending rear portion 61 is also supported by an inclined brace 66, extending from the front laterally projecting bar 62 to the upper end of the shank or pivot 65 and provided at its terminals, which are angularly bent, with front and rear eyes or openings for the front pivot bolt 67 and the rear shank or pivot 65. The bracket 58 consists of a vertical body portion provided at its upper end with an integral vertical sleeve 68 and having an integral horizontal sleeve 69 at its lower end. The sleeve 68 is adjustably arranged on the shank or pivot 65 and is capable of vertical and horizontal rotary movement, and it is secured in its adjustment by set screws 70. The shank or pivot 65 of the sleeve 68 may have interlocking corrugations similar to those heretofore described. The lower horizontal sleeve forms a bearing for one arm 71 of an L-shaped bolt or pivot member 72. The arm or portion 71 extends through the sleeve 69 and is adjustably secured to the same by inner and outer nuts 72ª, engaging screw threads 73 of the L-shaped pivot bolt or member. The other arm or portion 74 extends through the disk 57, which is secured to the L-shaped bolt or member by inner and outer nuts 75, washers being preferably interposed between the disks and the nuts. The L-shaped pivot bolt or member is adjustable in the lower horizontal sleeve 69, which enables the disk to be arranged at the desired pitch or inclination, the lateral twist or lead and the vertical movement being obtained through the adjustment of the bracket on the shank or pivot.

The cultivator is equipped with gage wheels 76, mounted on a transverse shaft or axle 77, which is arranged in suitable bearings of an adjustable standard 78, preferably consisting of U-shaped upper and lower portions 79 and 80, suitably secured together. The lower portion 80 is adjustably connected by braces 81 with the cultivator beam, and the upper portion is provided with an extension 82, having a toothed segment 83 and connected by a pivot 84 with an operating lever 85. The operating lever 85, which extends longitudinally of the cultivator to the rear portion thereof, is pivoted at its front end to the beam by a transverse bolt 86, and it is adapted to be oscillated to raise and lower the disks of the cultivator. The cultivator is secured in its adjustment by a dog or detent 87, mounted on the lever 85 and arranged to engage the toothed segment 83. The braces 81, which are inclined, are pivoted at their upper ends to the beam at opposite sides thereof by a transverse bolt 88, and they are provided at their lower ends with perforations 89, arranged at intervals and adapted to receive bolts 90 to permit an adjustment of the standard. The cultivator is equipped with pivoted handles 91, connected at their lower front ends to the beam and adjustably supported at an intermediate point by inclined braces 92, pivoted to the beam and provided at their upper ends with perforations 93, arranged at intervals for the reception of bolts or other suitable fastening means for securing the handles to the braces.

Having thus fully described my invention, what I claim as new and desire to secure by Letters Patent, is:—

1. In a cultivator of the class described, the combination with a beam, and laterally extending bars pivotally connected with the beam, of longitudinally disposed bars carried by and pivotally connected with the laterally extending bars and having their rear portions bent downwardly and provided with vertically arranged pivot portions, and disks provided with means for adjustably mounting them on the vertical pivot portions of the longitudinal bars.

2. In a cultivator of the class described, the combination with a beam, and laterally extending bars pivotally connected with the beam, of longitudinally disposed bars carried by and pivotally connected with the laterally extending bars and having depending shanks or pivot portions, disks provided with means for adjustably mounting them on the pivot portions of the longitudinal bars, and inclined braces extending upwardly and forwardly from the pivot portions of the longitudinal bars and connected with the front ends of the same.

3. In a cultivator of the class described, the combination with a beam, and laterally extending bars pivotally connected with the beam, of longitudinally disposed spring bars pivotally connected with and carried by the laterally projecting bars and having depending rear portions, disks provided with means for adjustably mounting them on the depending rear portions of the spring bars, and inclined braces detachably connected with the front and rear portions of the spring bars and adapted to be removed to permit independent spring action of said bars.

4. In a cultivator of the class described, the combination with a beam, and laterally projecting bars pivotally connected with the beam, of horizontal bars pivotally connected with the said bars and having depending rear portions provided with lower vertical pivot portions, brackets having upper bearings adjustably secured to the pivot portions, and disks adjustably connected with the brackets.

5. In a cultivator of the class described, the combination with a beam, and laterally projecting bars pivotally connected with the beam, of horizontal bars pivotally connected with the said bars and having depending rear portions provided with lower vertical pivot portions, brackets adjustably mounted on the vertical pivot portions and provided with lower curved arms, pivots secured to and adjustable along the curved arms, and disks mounted on the pivots.

6. In a cultivator of the class described, the combination with bars provided with lower terminal approximately vertical pivots, brackets having vertical bearings at their upper ends receiving the pivots and having a vertical slidable adjustment and a horizontal rotary adjustment thereon, said brackets being also provided at their lower ends with downwardly curved arms having longitudinal slots, pivots extending through the slots and provided with means for adjustably securing them to the curved arms and projecting from the convex faces thereof, and disks arranged at the convex faces of the arms and mounted on the projecting portions of the pivots, which are slidable upwardly and downwardly along the arms to arrange the disks in a vertical or inclined position.

7. In a cultivator of the class described, the combination with bars provided with approximately vertical pivots, brackets provided at their upper ends with bearings receiving the pivots and adjustably secured to the same, said brackets being also provided at their lower ends with curved arms having longitudinal slots, and pivots extending through the slots, adjusting means including clamping blocks arranged on the pivots and engaging the curved faces of the said arms, and disks mounted on the pivots.

In testimony, that I claim the foregoing as my own, I have hereto affixed my signature in the presence of two witnesses.

ARTHUR BRIGDEN.

Witnesses:
HUGH ABERCROMBIE,
BUS THOMPSON.

---

Copies of this patent may be obtained for five cents each, by addressing the "Commissioner of Patents, Washington, D. C."